(No Model.) 2 Sheets—Sheet 1.

W. L. WHITEWAY.
LUNCH BOX.

No. 443,183. Patented Dec. 23, 1890.

Witnesses:
Chas. E. Gaylord,
J. W. Dyrenforth

Inventor:
William L. Whiteway,
By Dyrenforth & Dyrenforth,
Attys.

THE NORRIS PETERS CO., PHOTO-LITHO., WASHINGTON, D. C.

(No Model.) 2 Sheets—Sheet 2.

W. L. WHITEWAY.
LUNCH BOX.

No. 443,183. Patented Dec. 23, 1890.

Witnesses:
Chas. E. Gaylord,
J. W. Dyrenforth

Inventor.
William L. Whiteway
By Dyrenforth & Dyrenforth
Attys.

UNITED STATES PATENT OFFICE.

WILLIAM L. WHITEWAY, OF CHICAGO, ILLINOIS, ASSIGNOR OF ONE-HALF TO ZERO MARX, OF SAME PLACE.

LUNCH-BOX.

SPECIFICATION forming part of Letters Patent No. 443,183, dated December 23, 1890.

Application filed July 25, 1890. Serial No. 359,913. (No model.)

*To all whom it may concern:*

Be it known that I, WILLIAM L. WHITEWAY, a subject of the Queen of Great Britain, residing at Chicago, in the county of Cook and State of Illinois, have invented a new and useful Improvement in Lunch-Boxes, of which the following is a specification.

My invention relates to improvements in the class of lunch-boxes which when not in use is designed to be folded into a comparatively small compass for convenience in carriage; and my object is to provide such a device of a durable, economical, and generally improved construction, which will cause it when unfolded for use to afford a commodious and most desirable device for its purpose and give to it when folded the most compact and convenient form for carrying about.

My object is also to provide the device with removable receptacles, whereby different articles of food placed in the lunch-box may be kept separate, which receptacles are arranged to be nested together in the most convenient manner when the device is folded.

My object is, further, to provide the device with means whereby food may be cooked or heated when desired, and, still further, to so construct the device as to permit it to be easily and quickly taken apart for the purpose of cleaning.

To the above ends my invention consists in the general construction of my improved lunch-box, and also in details of the construction and combinations of parts, hereinafter described and claimed.

Figure 1:
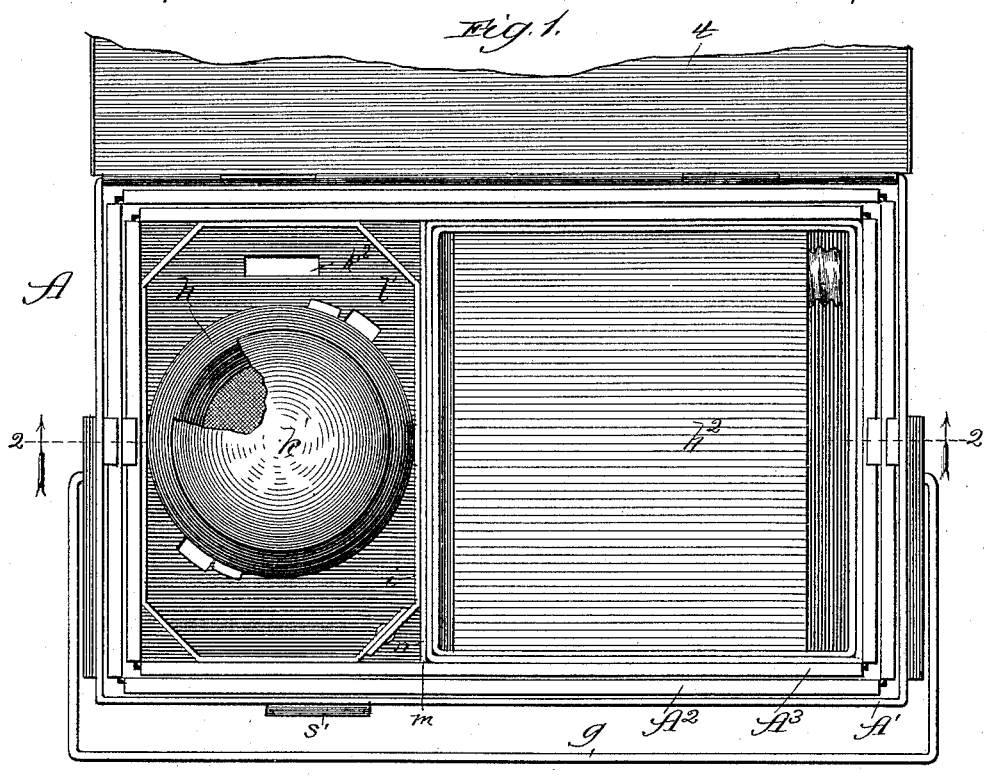
Figure 2:
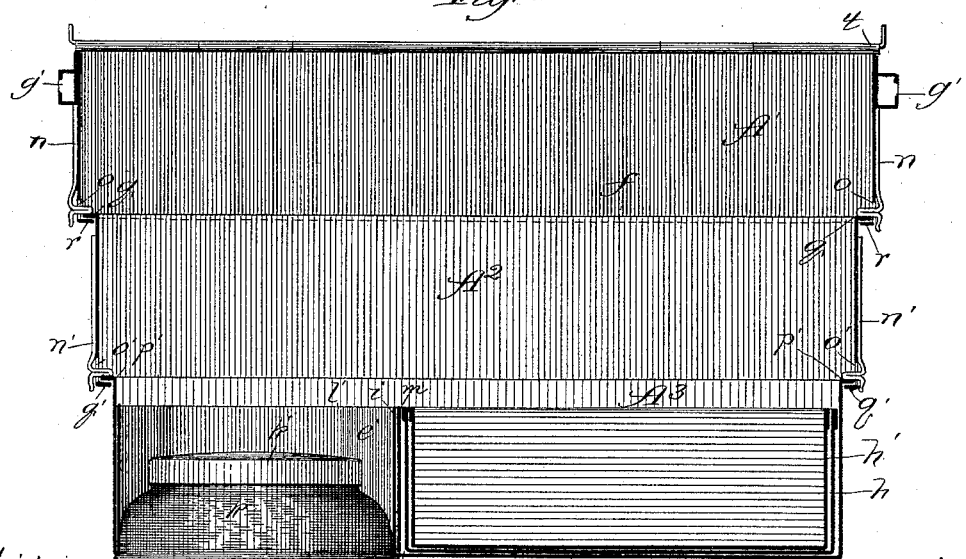
Figure 3:
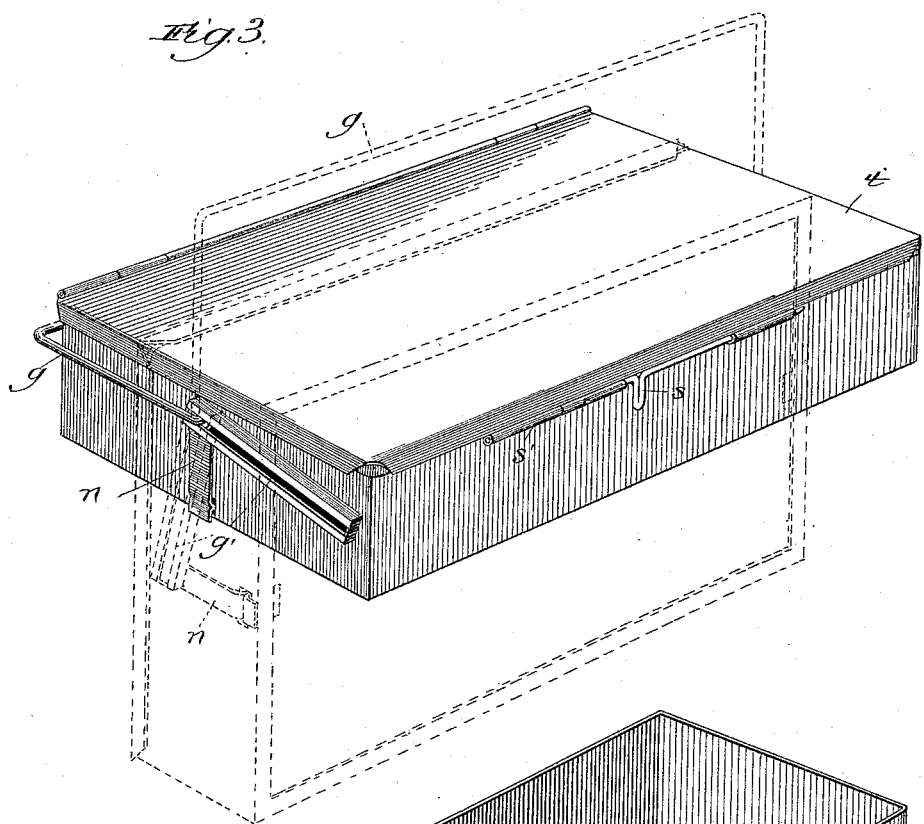
Figure 4:
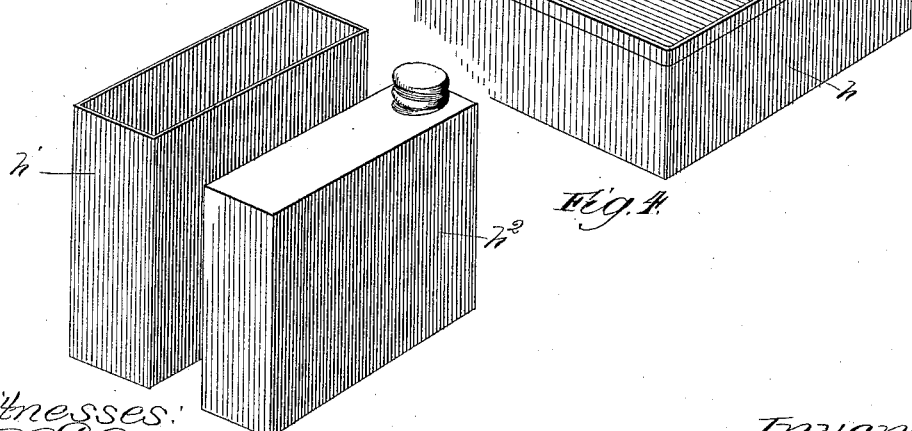

In the drawings, Figure 1 is a top plan view of my device with the cover opened and partly broken away, the removable cover of the lamp feature being also partly broken away for purposes of illustration; Fig. 2, a section (the device being unfolded) taken on the line 2 2 of Fig. 1 and viewed in the direction of the arrows; Fig. 3, a perspective view of the lunch-box folded with a similar view in dotted lines at right angles thereto to illustrate different relative positions to which the bail or handle is capable of being adjusted, and Fig. 4 a group in perspective of the furniture or removable receptacles of the device.

A is the lunch-box, which is made in vertically-telescoping sections $A'$, $A^2$, and $A^3$. The section $A'$ has a suitable cover, which is hinged at one edge and flanged at the remaining edges to overlap the upper edge of the said section. The cover is fastened down, when closed, by a sliding bolt $s$, which engages a socket $s'$ on the side of the box. The section $A'$ is open at the bottom and provided around its lower edge with an inwardly-projecting flange $r$. The section $A^2$ has no bottom, and is provided with an outwardly-projecting flange $q$ around its upper edge and an inwardly-projecting flange $q'$ around its lower edge. The section $A^3$ is formed with a bottom $p$ and around its top with an outwardly-projecting flange $p'$. The body portion of the section $A^2$ is of a size which permits it to pass loosely downward through the section $A'$ and rest with its flange $q$ on the flange $r$ of the latter section, and the section $A^3$ is of a size which permits it to pass downward through the section $A^2$ and rest with its flange $p'$ on the flange $q'$ of the section $A^2$. At opposite sides of the sections $A'$ and $A^2$, adjacent to the flanges at their lower edges, are openings $o$ $o'$, respectively, through which extend spring-actuated catches $n$ $n'$, which spring over the upper flanges of the two lower sections and operate to secure the sections against telescoping.

Extending across the section $A^3$ is a partition $m$, dividing the section into two compartments $l$ and $l'$. In the compartment $l'$ is a heater, preferably in the form of a spirit-lamp $k$, having a tight-fitting cover $k'$; and adjacent to the lamp is an opening $k^2$ through the bottom of the section $A^3$, through which a match may be introduced when the lamp is to be ignited. Around the lamp $k$, and intervening between it and the walls of the compartment $l'$, is a shield $i$, formed of a strip of metal squared off at the corners, as shown, to protect the soldered corners of the compartment from the heat of the lamp. The lamp may be inserted through the bottom of the section $A^3$ through an opening provided for the purpose, and held by suitable catches, whereby it may be removed from the device, so that its cover $k'$ may be taken off and replaced without disturbing the other contents.

Fitting into the compartment $l$ is a removable receptacle or dish. Two or more such dishes of graduated sizes may be employed to nest together, and fitting into the smallest dish $h$ is a receptacle $h'$, open at one end, and into which fits a receptacle or flask $h^2$, having a screw-stopper.

In use, the device being unfolded, as shown in Fig. 2, and secured against collapsing by the catches $n\ n'$, the receptacles $h\ h'\ h^2$ may be removed and filled and placed one upon the other in the device, the remaining space in the box being also utilized for the storage of edibles, &c., which also operate to keep the receptacles in place.

The box is provided with a bail or handle $g$, which affords convenient means for carrying it.

When the contents of the box are removed the sections may be telescoped together after withdrawing the spring-catches $n\ n'$, which hold them in place. On removing the cap $k'$ of the lamp the latter may be ignited and the receptacles placed over it, so that their contents may be heated. The receptacle $h'$ is particularly adapted for boiling eggs or like purposes.

Accompanying the device as a part thereof is a removable bottom plate $f$, (shown by dotted lines in Fig. 2,) which fits into the section $A'$ to rest at its edges upon the flange $r$. When it is desired to fold up the box, the sections $A^2$ and $A^3$ are lifted out of the section $A'$ and the plate $f$ placed in position, which latter prevents the sections $A^2\ A^3$ when again placed in the section $A'$ from slipping through. The receptacles being nested together and placed in the compartment $l$ and the cover fastened down, the device is in a compact condition for carriage. When the box is in use, the plate $f$ may be placed over the contents under the cover.

The bail or handle $g$ is secured at the ends to slide in corresponding guides $g'$ on opposite ends of the section $A'$. The guides extend from midway between the sides of the section, toward the top, to midway between the top and bottom of the section near one side. Thus the handle may be turned over to one side, out of the way, as shown by full lines in Fig. 3, when it is desired to carry the folded device in the pocket; or it may be slid to the other end of the guides, as indicated by dotted lines, and used as a handle.

As the various parts are capable of being separated, as described, every part of the device may be readily and thoroughly cleaned.

While I prefer to employ the construction in all its details, as described, I do not confine my invention thereto, as the device is susceptible of various modifications which do not depart from the spirit of the invention. Thus two or more than three vertically-telescoping sections may be employed. Any one or all the receptacles and the lamp may be left out, and other well known and equivalent means of fastening may be employed in the place of the spring-catches $n\ n'$.

What I claim as new, and desire to secure by Letters Patent, is—

1. In a folding lunch-box, the combination of horizontally-disposed and vertically-telescoping sections, the lower section being closed at the bottom and open at the top and the upper section being bottomless and provided with a cover and arranged to slide over the lower section, the lower end of the upper section extending under and engaging the upper end of the lower section to prevent separation of the sections in the direction of their extension, substantially as described.

2. In a folding lunch-box, the combination of a section $A^3$, having a bottom $p$ and an outwardly-extending flange $p'$ at its upper edge and a bottomless section to slide over the section $A^3$, provided at its base with an inwardly-projecting flange $q'$ to engage the flange $p'$, and fastening means, as the catches $n\ n'$, upon one of the sections to hold the flanges together, substantially as described.

3. In a folding lunch-box, the combination of horizontally-disposed and vertically-telescoping sections, means, as the flanges $p'\ q'\ q\ r$ and catches $n\ n'$, upon the sections for securing them in their unfolded condition one above the other, to afford a practically-continuous receptacle, a bottom $p$ on the lowermost section, and an opening and closing cover and handle on the uppermost section, substantially as described.

4. In a lunch-box, substantially as described, the section $A^3$, divided into compartments $l$ and $l'$, receptacles, as the dishes $h\ h'$ and flask $h^2$, nested together in the compartment $l$, a heater $k$ in the compartment $l'$, and a shield $i$ in the compartment $l'$ about the heater, substantially as described.

5. In a folding lunch-box, the combination of horizontally-disposed and vertically-telescoping sections, means, as the flanges $p'\ q'\ r$ and catches $n\ n'$, upon the sections for securing them in their unfolded condition one above the other, to afford a practically-continuous receptacle, a bottom $p$ in the lowermost section, and an attachable and removable bottom plate $f$ for and an opening and closing cover and handle on the uppermost receptacle, substantially as and for the purpose set forth.

6. A folding lunch-box formed with horizontally-disposed and vertically-telescoping sections, one of said sections having guides $g'$ on opposite ends, in combination with a handle $g$, secured at opposite ends in the guides to slide in the latter, substantially as and for the purpose set forth.

WILLIAM L. WHITEWAY.

In presence of—
J. W. DYRENFORTH,
M. J. FROST.